Patented Apr. 11, 1939

2,153,591

UNITED STATES PATENT OFFICE 2,153,591

PROCESS FOR THE PRODUCTION OF SALTS OF β-METHYLCHOLINE AND ACYL DERIVATIVES THEREOF

Georg Roeder, Rahway, N. J., assignor to Merck & Co. Inc., Rahway, N. J., a corporation of New Jersey No Drawing. Application January 30, 1937, Serial No. 123,154

9 Claims. (Cl. 260—482)

This invention relates to improvements in processes for preparing salts of β-methylcholine, and their acylated derivatives.

Morley, (Ber. der Deut. Chem. Ges. 13, 1880, p. 1805) has reported a process for the preparation of β-methylcholine chloride and derivatives thereof from chloro-isopropyl alcohol and trimethylamine. More recently, Major and Cline have produced β-methylcholine chloride by the reduction of trimethyl-acetonyl ammonium chloride, and have also produced its acyl derivatives. (See U. S. Patent Nos. 2,040,145 and 2,040,146, issued May 12, 1936.)

However, each of these processes involves disadvantages which detract from its suitability for the production of β-methylcholine salts and their derivatives on a commercial scale. The process described by Morley requires the use of an autoclave for technical reasons, and, furthermore, it is doubtful if the pure β-isomer can be obtained by this process without further purification.

On the other hand, the halogenated acetones employed as starting materials in the Major and Cline process are not readily available commercial products and great precautions must be taken in their manufacture, because of the pronounced irritating properties which they exhibit.

I have now found a process which does not involve the foregoing disadvantages and by which the β-methylcholine salts may be directly prepared in substantial yield.

Generally speaking, my process comprises reacting upon propylene oxide with an aqueous solution of trimethylamine.

It has been believed, generally, heretofore, that when this reaction is applied to propylene oxide, two different compounds may be formed, namely, 1-oxy-2-trimethylammonium propane or 1-trimethylammonium-2-oxy-propane.

I have now found that, as a matter of fact, only the last-named compound is formed as a result of this reaction, that is, 1-trimethylammonium-2-oxy-propane, and that it is possible to utilize this reaction for the preparation of β-methylcholine, its salts and derivatives.

This process is particularly advantageous because it permits the work to be carried out in an open vessel, so that the oxide can be dropped into the ice-cooled solution or trimethylamine. The alkaline solution can be then neutralized with any inorganic acid such as hydrochloric, hydrobromic, hydroiodic, sulfuric, and phosphoric acids or any organic acid, such as tartaric, citric, and acetic acids, for example, so that any salt of β-methylcholine can be prepared directly, without the necessity of later conversion. After evaporation of the neutralized solution, the salts of β-methylcholine can be isolated, or, if desired, they can be acylated in the same vessel without previous purification.

The yield of salts of β-methylcholine and their acylated derivatives thus obtained is practically quantitative.

The following specific example which is set forth as a preferred and efficient means for applying the processes and producing the products of my invention, is described by way of illustration and not limitation, and obviously may be modified in certain respects without departing from the spirit of my invention and the scope of the appended claims.

Example

About 50 gms. of propylene oxide are dropped into about 205 gms. of an aqueous 30% solution of trimethylamine, at a temperature between 5 and 10° C. When reaction is complete, a thick oily mass remains. The reaction product is permitted to stand in ice for a while, after which, at room temperature, the water is evaporated in vacuo on a steam bath, to remove any unchanged starting materials. The residue is dissolved in water, phenolphtalein is added, the solution is neutralized with hydrochloric acid, and evaporated in vacuo on a steam bath. If the material is to be acylated, the water is removed as completely as possible, and the residue is dissolved in alcohol and the solvent again evaporated. β-methylcholine chloride then remains in the flask. It is placed on a steam bath, either without a solvent or dissolved in glacial acetic acid, and an excess of acetic anhydride is dropped in until no further vigorous reaction occurs. The mixture is then refluxed for about 4 hours, cooled, and precipitated with ether or ethylacetate.

The yield of acetyl-β-methylcholine chloride thus obtained is pratically quantitative.

The salt obtained will, of course, depend upon the acid used in the neutralization step. Thus, for instance, if hydriodic acid is used, β-methylcholine iodide will be obtained. This may also then be readily acylated, in accordance with the further steps exemplified above.

I claim as my invention:

1. The step in a process for the production of salts of β-methylcholine and its acyl derivatives, which salts are stable and may be purified comprising reacting propylene oxide with trimethylamine.

2. The process for the production of salts of β-methylcholine, intermediates for the production of their acyl derivatives, which comprises reacting propylene oxide with trimethylamine, dissolving the reaction product, neutralizing the solution with the appropriate acid, removing the solvent, and crystallizing out the corresponding salt.

3. A process for the production of β-methylcholine chloride, an intermediate for the production of acyl β-methylcholine chloride, which comprises reacting propylene oxide with trimethylamine, dissolving the reaction product, neutralizing the solution with hydrochloric acid, removing the solvent, and crystallizing out the formed β-methylcholine chloride.

4. A process for the production of β-methylcholine iodide, an intermediate for the production of acetyl β-methylcholine iodide, which comprises reacting propylene oxide with trimethylamine, dissolving the reaction product, neutralizing the solution with hydriodic acid, removing the solvent, and crystallizing out the formed β-methylcholine iodide.

5. A process for the production of β-methylcholine bromide, an intermediate for the production of acetyl-β-methylcholine bromide, which comprises reacting propylene oxide with trimethylamine, dissolving the reaction product, neutralizing the solution with hydrobromic acid, removing the solvent, and crystallizing out the formed β-methylcholine bromide.

6. A process for the production of acylated salts of β-methylcholine which comprises reacting propylene oxide with trimethylamine, dissolving the reaction product, neutralizing the solution with the appropriate acid, removing the solvent, and acylating.

7. A process for the production of acetyl-β-methylcholine chloride which comprises reacting propylene oxide with trimethylamine, dissolving the reaction product, neutralizing the solution with hydrochloric acid, removing the solvent, and treating the reaction product with acetic anhydride.

8. A process for the production of acetyl-β-methylcholine iodide which comprises reacting propylene oxide with trimethylamine, dissolving the reaction product, neutralizing the solution with hydriodic acid, removing the solvent, and treating the reaction product with acetic anhydride.

9. A process for the production of acetyl-β-methylcholine bromide which comprises reacting propylene oxide with trimethylamine, dissolving the reaction product, neutralizing the solution with hydrobromic acid, removing the solvent, and treating the reaction product with acetic anhydride.

GEORG ROEDER.